US012060818B2

(12) United States Patent
Krause

(10) Patent No.: US 12,060,818 B2
(45) Date of Patent: Aug. 13, 2024

(54) MUFFLER AND METHOD FOR MAKING A MUFFLER

(71) Applicant: Purem GmbH, Neunkirchen (DE)

(72) Inventor: Michael Krause, Esslingen (DE)

(73) Assignee: Purem GmbH, Neunkirchen (DE)

( * ) Notice: Subject to any disclaimer, the term of this patent is extended or adjusted under 35 U.S.C. 154(b) by 138 days.

(21) Appl. No.: 17/843,803

(22) Filed: Jun. 17, 2022

(65) Prior Publication Data

US 2022/0403765 A1 Dec. 22, 2022

(30) Foreign Application Priority Data

Jun. 21, 2021 (DE) ..................... 10 2021 115 962.8

(51) Int. Cl.
*F01N 1/02* (2006.01)
*G10K 11/16* (2006.01)

(52) U.S. Cl.
CPC ............ *F01N 1/023* (2013.01); *G10K 11/161* (2013.01); *F01N 2470/14* (2013.01); *F01N 2470/18* (2013.01)

(58) Field of Classification Search
CPC .. F01N 1/023; F01N 2470/14; F01N 2470/18; F01N 13/18; G10K 11/161
See application file for complete search history.

(56) References Cited

U.S. PATENT DOCUMENTS 4,473,131 A * 9/1984 Clegg ................. F01N 13/1844 181/243
8,205,713 B2 * 6/2012 Gorke ................. F01N 13/1838 181/227
8,205,716 B2 * 6/2012 Wirth .................... F01N 13/185 181/269
8,292,026 B2 * 10/2012 Tauschek ................ F01N 1/023 181/227
10,267,207 B2 * 4/2019 Krause ................ F01N 13/1844
(Continued)

FOREIGN PATENT DOCUMENTS

DE 10 2009 018 957 A1 10/2010
DE 10 2010 015 322 A1 10/2011
EP 1 888 891 B1 2/2008

OTHER PUBLICATIONS

English translation of DE 102010015322 A1, accessed via Espacenet on Dec. 29, 2023, <https://translationportal.epo.org/emtp/translate/?ACTION=description-retrieval&COUNTRY=DE&ENGINE=google&FORMAT=docdb&KIND=A1&LOCALE=en_EP&NUMBER=102010015322&SRCLANG=de&TRGLANG=en> (Year: 2011).*

*Primary Examiner* — Jeremy A Luks
(74) *Attorney, Agent, or Firm* — Walter Ottesen, P.A.

(57) ABSTRACT

A muffler for an exhaust system of an internal combustion engine includes a muffler housing having a peripheral wall elongated along a longitudinal housing axis. The muffler has an end wall on each axial end region of the peripheral wall and a muffler insert, surrounded by the peripheral wall and supported on the peripheral wall. A retaining wall extends substantially in the direction of the longitudinal housing axis and a first exhaust-gas routing pipe is positioned with a first end region engaging in an opening in the peripheral wall and is secured to the peripheral wall and retained with a second end region on the retaining wall. The first exhaust-gas routing pipe is retained in its second end region on the retaining wall by force closure or interlocking.

24 Claims, 5 Drawing Sheets

(56) References Cited

U.S. PATENT DOCUMENTS

| | | | | |
|---|---|---|---|---|
| 2006/0251470 | A1* | 11/2006 | Prause | B60N 2/682 403/119 |
| 2008/0196969 | A1 | 8/2008 | Henke et al. | |
| 2015/0330283 | A1 | 11/2015 | Carr et al. | |
| 2019/0120115 | A1* | 4/2019 | Zdravkov | F01N 13/185 |

* cited by examiner

MUFFLER AND METHOD FOR MAKING A MUFFLER

CROSS REFERENCE TO RELATED APPLICATION

This application claims priority of German patent application no. 10 2021 115 962.8, filed Jun. 21, 2021, the entire content of which is incorporated herein by reference.

TECHNICAL FIELD

The present disclosure relates to a muffler for an exhaust system of an internal combustion engine, in particular in a motor vehicle, and also to a method for producing a muffler.

BACKGROUND

A muffler is known from US 2008/0196969. In this known muffler, a muffler insert has been constructed with two partitions, arranged at a distance from one another in the direction of a longitudinal axis of a muffler housing, and accommodating a retaining wall between them. The muffler insert is surrounded by a peripheral wall, elongated in the direction of the longitudinal housing axis. A peripheral-wall opening formed in the peripheral wall has been positioned in such a manner that it is situated opposite a retaining-wall opening formed in the retaining wall. An exhaust-gas routing pipe, which provides an inlet pipe in this known muffler, is inserted into the muffler housing from outside through the peripheral-wall opening in such a manner that it has been positioned with a first end region in the region of the peripheral wall and has been secured to the peripheral wall in this region by welding. A second end region of the exhaust-gas routing pipe has been positioned so as to engage in or penetrate the retaining-wall opening and has been connected to the retaining wall by positive closure generated by mechanical reshaping.

SUMMARY

An object of the present disclosure is to provide a muffler for an exhaust system of an internal combustion engine and a method for making a muffler, with which a structure that is easy to realize and yet stable is obtained.

According to a first aspect of the present disclosure, this object can, for example, be achieved by a muffler for an exhaust system of an internal combustion engine, including:

- a muffler housing with a peripheral wall elongated in the direction of a longitudinal housing axis and with an end wall on each axial end region of the peripheral wall,
- a muffler insert, surrounded by the peripheral wall and supported on the peripheral wall, with at least one retaining wall extending substantially in the direction of the longitudinal housing axis,
- at least one first exhaust-gas routing pipe, the at least one first exhaust-gas routing pipe being positioned with a first end region engaging in a peripheral-wall opening in the peripheral wall and being secured to the peripheral wall and retained by a second end region on the at least one retaining wall.

The at least one first exhaust-gas routing pipe is retained in its second end region on the retaining wall by force closure or interlocking.

In a muffler according to the disclosure, the first exhaust-gas routing pipe is not retained on the retaining wall by reshaping—and consequently by the positive closure, generated by the reshaping, between the exhaust-gas routing pipe and a retaining wall—but is retained by measures that do not necessitate a reshaping of the first exhaust-gas routing pipe and of the retaining wall in the course of, or after, the moving of the exhaust-gas routing pipe into its installation position. Both the frictional force for obtaining the force closure—that is, a retentive effect by virtue of the frictional force acting between the first exhaust-gas routing pipe and the retaining wall—and the shapes—both of the first exhaust-gas routing pipe and of the retaining wall—required for obtaining the interlocking are provided prior to assembly. In the course of assembly, the components to be retained on one another— that is, the at least one first exhaust-gas routing pipe and the retaining wall—are merely moved with respect to one another. In the course of this movement, a slight deformation of the retaining wall, for instance, may occur for the purpose of obtaining the force closure, but this deformation lies completely within the range of elasticity. A deformation of the retaining wall, for instance, that lies within the range of elasticity may also occur temporarily, for instance, in the course of establishing the interlocking. However, such deformations occurring within the range of elasticity of the components involved are not deformations of the components concerned resulting in a new configuration and in a positive closure generated thereby; in particular, they are not deformations that are generated by the influence of tools on these components only after the two components have been brought into their relative positioning required for the structure.

In order to obtain a gas-tight seal of the muffler toward the outside, the at least one first exhaust-gas routing pipe may have been connected to the peripheral wall by welding.

The at least one first exhaust-gas routing pipe may be an inlet pipe via which exhaust gas is introduced into the interior of the muffler.

For a stable retentive interaction between the retaining wall and the at least one first exhaust-gas routing pipe, it is proposed that a retaining-wall opening, surrounded at least in some regions by a bent fastening-edge region of the at least one retaining wall, has been provided in the at least one retaining wall, assigned to the at least one first exhaust-gas routing pipe, and that the at least one first exhaust-gas routing pipe has been positioned with its second end region engaging in the retaining-wall opening and has been retained in the retaining-wall opening in the region of the fastening-edge region by press fit. In the course of insertion of the first exhaust-gas routing pipe into the retaining-wall opening surrounded by the fastening-edge region, the fastening-edge region can be radially spread apart somewhat within the range of the elastic deformability thereof, as a result of which the frictional force generating the force closure can be provided efficiently by prestressing of the fastening-edge region against the outer surface of the exhaust-gas routing pipe.

Depending on the direction in which the at least one first exhaust-gas routing pipe is moved with respect to the at least one retaining wall in the course of assembly, the fastening-edge region may have been bent in the direction toward the first end region of the at least one first exhaust-gas routing pipe, or the fastening-edge region may have been bent in the direction away from the first end region of the at least one first exhaust-gas routing pipe. The fastening-edge region has preferentially been bent in the direction in which the at least one first exhaust-gas routing pipe is moved with respect to the retaining wall. As a result, a tilting of the fastening-edge region can be avoided, and the at least one first exhaust-gas routing pipe can be easily inserted into the retaining-wall opening surrounded by the fastening-edge region.

For a stable force closure between the at least one first exhaust-gas routing pipe and the at least one retaining wall, a completely circumferential abutting contact in the peripheral direction between the at least one first exhaust-gas routing pipe and the at least one retaining wall may have been provided in the region of the retaining-wall opening provided on the at least one retaining wall, assigned to the at least one first exhaust-gas routing pipe.

The insertion of the at least one first exhaust-gas routing pipe into the assigned retaining-wall opening can be carried out more easily when, for the purpose of providing the force closure between the at least one first exhaust-gas routing pipe and the at least one retaining wall in the region of the retaining-wall opening provided on the at least one retaining wall, assigned to the at least one first exhaust-gas routing pipe, an abutting contact, interrupted in at least one peripheral region, has been provided between the at least one first exhaust-gas routing pipe and the at least one retaining wall.

For this purpose there may be provision, for instance, that at least one preferentially slot-like wall-interruption region, preferentially a plurality of preferentially slot-like wall-interruption regions arranged at a distance from one another in the peripheral direction around the retaining-wall opening, open toward the retaining-wall opening, has/have been provided in the at least one retaining wall in the region of the retaining-wall opening provided on the at least one retaining wall, assigned to the at least one first exhaust-gas routing pipe. Consequently, several tongues on the retaining wall, effective for the force closure and succeeding one another in the peripheral direction and separated from one another by wall-interruption regions, are provided which can be elastically deformed comparatively easily in the course of the insertion of a first exhaust-gas routing pipe.

For the purpose of providing the interlocking, a detent formation may have been provided on the second end region of the at least one first exhaust-gas routing pipe, and a mating detent formation in detent engagement with the detent formation may have been provided on the at least one retaining wall, assigned to the detent formation.

In a configuration avoiding a constriction of the flow volume of exhaust gas in the at least one first exhaust-gas routing pipe, it is proposed that the detent formation comprises at least one detent projection protruding radially outward with respect to a longitudinal axis of the at least one first exhaust-gas routing pipe.

Depending on the configuration of the mating detent formation, the detent formation may comprise at least two detent projections succeeding one another in the direction of the longitudinal pipe axis, or/and the detent formation may comprise at least two detent-projection segments succeeding one another around the longitudinal pipe axis in the peripheral direction.

If at least one detent projection, preferentially each detent projection, has been provided by a bead-like shaping of the at least one first exhaust-gas routing pipe, the at least one first exhaust-gas routing pipe can be provided with the detent formation in straightforward manner. However, unlike in the state of the art, the fashioning of the exhaust-gas routing pipe required for this purpose is carried out prior to the integration thereof into the muffler, in a machining phase in which this exhaust-gas routing pipe can be easily handled as an isolated component.

A retaining-wall opening may have been provided in the at least one retaining wall, assigned to the at least one first exhaust-gas routing pipe, in which case, furthermore, a plurality of preferentially slot-like wall-interruption regions, arranged at a peripheral distance from one another around the retaining-wall opening and open toward the retaining-wall opening, may have been provided in the at least one retaining wall, and a detent tongue of the mating detent formation may have been formed between at least two wall-interruption regions immediately succeeding one another in the peripheral direction.

For the purpose of establishing the detent state, at least one detent tongue, preferentially each detent tongue, of the mating detent formation can engage between two detent projections of the detent formation succeeding one another in the direction of the longitudinal pipe axis.

In another configuration, a detent recess for receiving at least one detent projection of the detent formation may have been provided on at least one detent tongue, preferentially on each detent tongue.

In order to avoid a mutual abutment between a retaining wall and a first exhaust-gas routing pipe in sharp-edged regions, it is proposed that a bent detent-tongue edge region has been provided on the at least one retaining wall near at least one detent tongue, preferentially near each detent tongue.

If the detent formation comprises two detent projections arranged at an axial distance from one another, at least one detent-tongue edge region, preferentially each detent-tongue edge region, can engage between two detent projections of the detent formation succeeding one another in the direction of the longitudinal pipe axis.

In an alternative configuration, at least one detent recess may have been provided on at least one detent-tongue edge region, preferentially on each detent-tongue edge region.

The muffler insert may include at least two partitions arranged so as to be substantially orthogonal to the longitudinal housing axis and supported on the peripheral wall, the at least one retaining wall being secured to one of the partitions in each of two opposite end regions of the wall.

Furthermore, the muffler insert may include at least one second exhaust-gas routing pipe, preferentially an outlet pipe, in which case a partition opening has been provided in at least one of the partitions connected to the at least one retaining wall, assigned to the at least one second exhaust-gas routing pipe, and an end-wall opening has been provided in one of the end walls, the at least one second exhaust-gas routing pipe having been positioned so as to engage in the partition opening and in the end-wall opening, and having been secured by material closure in the region of the end-wall opening to the end wall exhibiting the end-wall opening or/and in the region of at least one partition opening to the partition exhibiting the partition opening.

According to a further aspect, the object stated in the introduction is achieved by a method for making an exhaust muffler, including the following measures:

a) providing at least one muffler insert with at least one retaining wall and with at least one retaining-wall opening in the at least one retaining wall,
b) providing at least one first exhaust-gas routing pipe,
c) surrounding the at least one muffler insert with a peripheral wall of a muffler housing, a peripheral-wall opening having been provided in the peripheral wall, assigned to the at least one retaining-wall opening,
d) arranging the at least one first exhaust-gas routing pipe in such a manner that a first end region of the at least one first exhaust-gas routing pipe is positioned so as to engage in the peripheral-wall opening provided, assigned to the at least one retaining-wall opening, and a second end region of the at least one first exhaust-gas routing pipe is retained in the at least one retaining-wall opening by force closure or interlocking, e) connecting the at least one first exhaust-gas routing pipe to the peripheral wall in the region of the peripheral-wall opening by material closure.

The positioning of the at least one first exhaust-gas routing pipe with its first end region in an assigned peripheral-wall opening can be carried out particularly easily when, in the course of measure a), the at least one first exhaust-gas routing pipe is positioned so as to engage in the at least one retaining-wall opening and, in the course of measure d), is moved, with its first end region leading, from inside in the direction toward the peripheral-wall opening until the first end region has been positioned so as to engage in the peripheral-wall opening and the second end region has been retained on the at least one retaining wall by force closure or interlocking so as to engage in the at least one retaining-wall opening. In this regard, the peripheral wall, shaped for the purpose of providing the peripheral-wall opening, may display a funnel action that directs the first end region of the pipe into the peripheral-wall opening.

In an alternative procedure, in the course of measure d) the at least one first exhaust-gas routing pipe can be moved, with its second end region leading, from outside through the peripheral-wall opening in the direction toward the at least one retaining wall until the first end region has been positioned so as to engage in the peripheral-wall opening and the second end region has been retained on the at least one retaining wall by force closure or interlocking so as to engage in the at least one retaining-wall opening. In this procedure, the at least one first exhaust-gas routing pipe can be handled easily from outside the muffler housing.

In the course of measure a), the at least one muffler insert can be provided in such a manner that the at least one retaining wall has been connected to a partition in each of two opposite end regions of the wall.

Furthermore, in the course of measure c) the at least one muffler insert can be surrounded with the peripheral wall by wrapping a plate-like peripheral-wall blank around the at least one muffler insert. In an alternative procedure, in the course of measure c) the at least one muffler insert can be surrounded by providing the peripheral wall with a structure that is closed in the peripheral direction and inserting the at least one muffler insert into the peripheral wall provided with a structure that is closed in the peripheral direction.

For the purpose of sealing the muffler housing at its axial end regions, a measure f) may have been provided for the purpose of securing an end wall to each of the axial end regions of the peripheral wall, elongated in the direction of a longitudinal housing axis, by material closure or/and positive closure before or after implementation of measure c).

The disclosure further relates to an exhaust system for an internal combustion engine, including at least one muffler constructed in accordance with the disclosure, which has preferentially been produced by a method according to the disclosure.

BRIEF DESCRIPTION OF THE DRAWINGS

The invention will now be described with reference to the drawings wherein.

DESCRIPTION OF THE PREFERRED EMBODIMENTS

Figure 1:
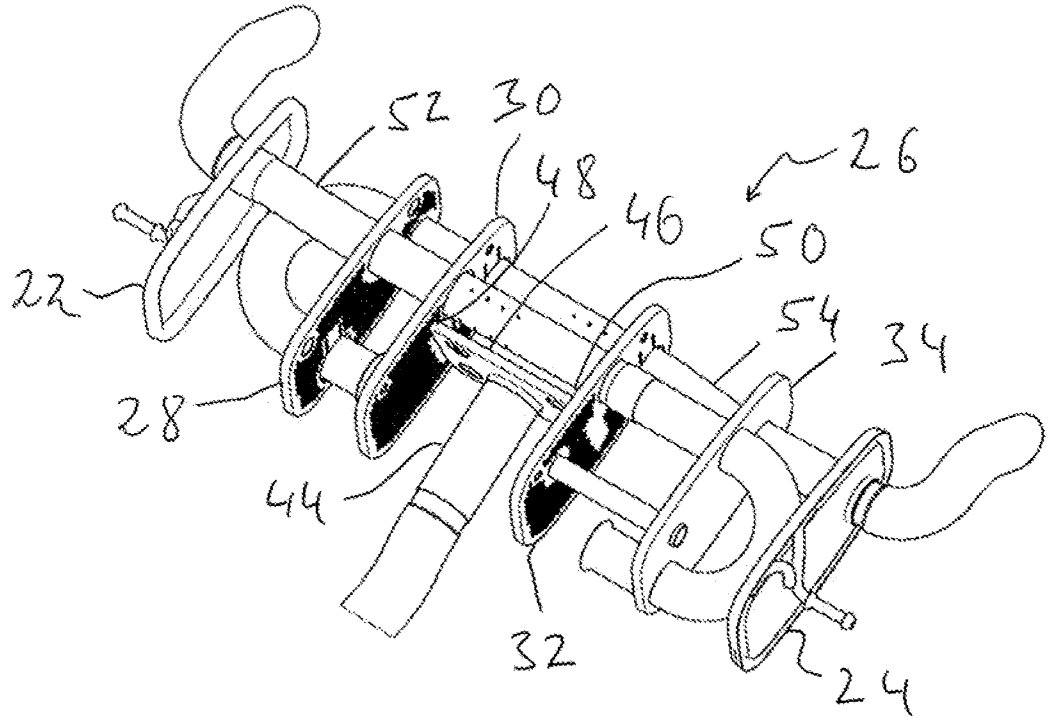
FIG. 1 is a perspective view of a muffler insert.

In FIG. 1, a muffler—integrated, for instance as a transverse muffler, in an exhaust system 10 of an internal combustion engine in a vehicle—is designated generally by 12. The muffler 12 includes a muffler housing 14, elongated in the direction of a longitudinal housing axis L, with a peripheral wall 16 surrounding the longitudinal housing axis L. End walls 22, 24 have been secured to the peripheral wall 16 at both axial end regions 18, 20 thereof. The peripheral wall 16 and the end walls 22, 24 have, for example, been provided as sheet-metal formed parts.

Figure 2:
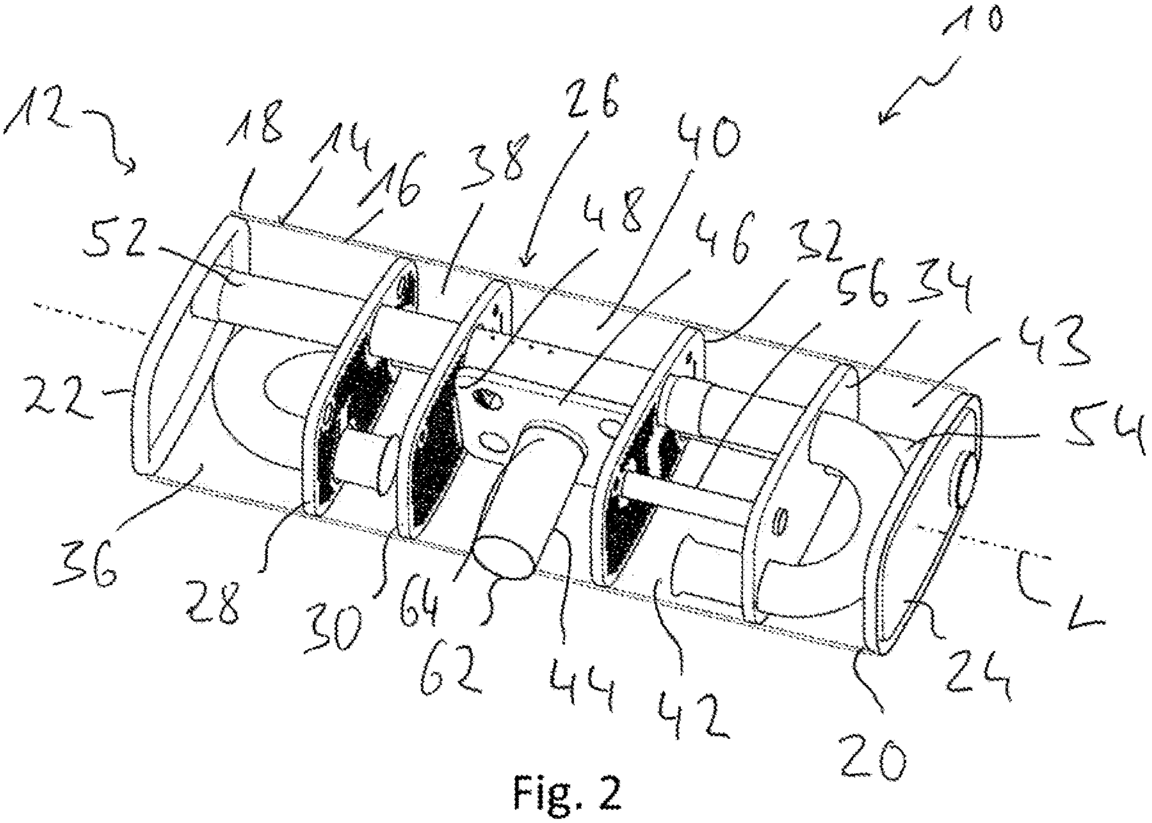
FIG. 2 is a muffler with the muffler insert shown in FIG. 1, the peripheral wall of a muffler housing being represented partially broken away.

A muffler insert, designated generally by 26, has been provided in the interior of the muffler housing 14. In the embodiment shown, this insert includes four partitions 28, 30, 32, 34—also shown in FIG. 2 and formed, for example, as sheet-metal formed parts—which subdivide the interior space of the muffler housing 14 into five chambers 36, 38, 40, 42, 43 succeeding one another in the direction of the longitudinal housing axis L. In this regard, openings may have been provided in the partitions 28, 30, 32, 34, via which the chambers 36, 38, 40, 42, 43 can communicate with one another.

The muffler insert 26 further includes a retaining wall 46—formed, for example, as a sheet-metal formed part—extending substantially in the direction of the longitudinal housing axis L and oriented so as to be substantially orthogonal to the partitions 28, 30, 32, 34. In its two axial end regions 48, 50, the retaining wall 46 has been firmly connected to the two partitions 30, 32, for instance by welding.

In the case of the muffler 12 shown in FIG. 1, a first exhaust-gas routing pipe 44 providing an inlet pipe has furthermore been provided, through which exhaust gas is conducted into chamber 40 in the muffler housing 14. In order to discharge the exhaust gas from the muffler housing 14, two second exhaust-gas routing pipes 52, 54 have been provided, each providing an outlet pipe. A partition opening has been provided in each of the partitions 28, 30, 32, 34, assigned to each second exhaust-gas routing pipe 52, 54. Each of the partition openings may be surrounded by a bent fastening-edge region formed on the respective partition, into which the respective second exhaust-gas routing pipe 52, 54 has been inserted. Advantageously, in the region of each such fastening-edge region, or of each partition opening, the respective second exhaust-gas routing pipe 52, 54 may be firmly connected to the respective partition 28, 30, 32, 24 by material closure, in particular by welding. Here, a circumferential weld seam may be provided, or individual welding spots may have been provided for the purpose of obtaining the firm connection.

An end-wall opening has been provided in end wall 22 arranged on axial end region 18 of the peripheral wall 16, assigned to second exhaust-gas routing pipe 52, into which second exhaust-gas routing pipe 52 has been positioned in engaging manner. In the region of this end-wall opening, an outwardly bent-over fastening-edge region, for instance, may be provided on end wall 22. Second exhaust-gas routing pipe 52 may be connected to end wall 22 in the region of this fastening-edge region by a preferentially circumferential weld seam. Likewise, an end-wall opening surrounded by an outwardly bent-over fastening-edge region has been formed on end wall 24 provided on axial end region 20 of the peripheral wall 16, into which second exhaust-gas routing pipe 54 has been positioned in engaging manner. Here, too, a completely circumferential welded joint may be formed for a gas-tight seal between second exhaust-gas routing pipe 54 and end wall 24.

In the interior of the muffler housing 14 the second exhaust-gas routing pipes 52, 54 may exhibit openings via which they are open to various of the chambers 36, 38, 40, 42, 43. Further pipes which provide a connection between various of the chambers 36, 38, 40, 42, 43 may also be provided in the interior of the muffler housing 14. For instance, a Helmholtz resonator may have been provided via a pipe 56 leading into the otherwise sealed chamber 43. As a matter of principle, it should be pointed out that the internal structure of the muffler 12 has been represented only in exemplary manner and may in various aspects—for instance, with regard to the number of partitions, chambers, pipes and also the course of pipes—be realized otherwise than as represented in the figures.

In the following, it will be explained how the first exhaust-gas routing pipe 44 has been integrated into the muffler 12, and how to proceed for the purpose of integrating the first exhaust-gas routing pipe 44 into the muffler 12. A first configuration variant for this will be elucidated in more detail in the following with reference to FIGS. 3 to 6.

Figure 3:
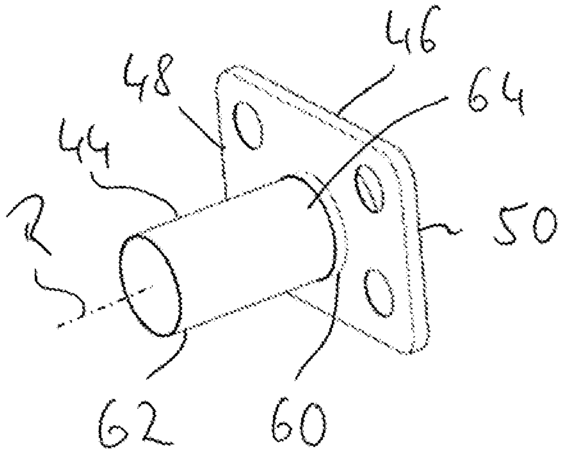
FIG. 3 is an exhaust-gas routing pipe, retained on a retaining wall, of the muffler shown in FIG. 2, in perspective view.
Figure 4:
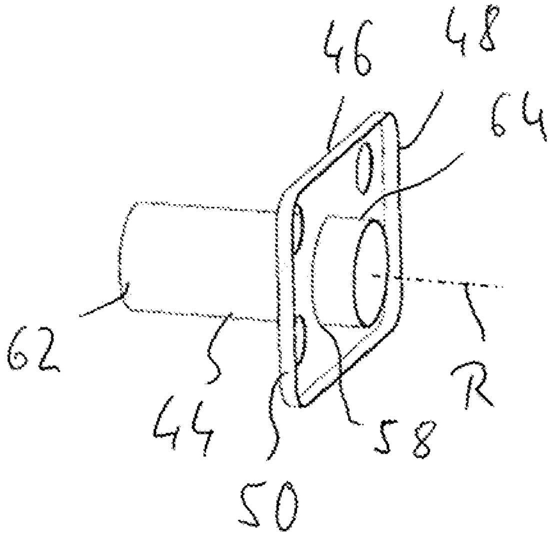
FIG. 4 is the exhaust-gas routing pipe, retained on the retaining wall, of the muffler shown in FIG. 2, in another perspective view.

FIGS. 3 and 4 show the retaining wall 46 and the first exhaust-gas routing pipe 44 in a preassembly state—that is, before the surrounding of the muffler insert 26 with the peripheral wall 16. FIGS. 3 to 6 show that a retaining-wall opening 58 has been formed in the retaining wall 46, for example, in a central region thereof. A fastening-edge region 60, preferentially completely encircling the retaining-wall opening 58, has been provided on the retaining wall 46, surrounding the retaining-wall opening 58. The fastening-edge region 60 has been bent away from the retaining wall 46, for instance by formation of a pull-through, and exhibits a substantially cylindrical structure.

The first exhaust-gas routing pipe 44 exhibits two end regions 62, 64. Prior to the surrounding of the muffler insert 26 with the peripheral wall 16, the first exhaust-gas routing pipe 44 is inserted into the retaining-wall opening 58 in such a manner that the first exhaust-gas routing pipe 44 has been positioned in the retaining-wall opening 58 in the region of its second end region 64. The first exhaust-gas routing pipe 44 can, for instance, be inserted into the retaining-wall opening 58 in the positioning represented in FIGS. 3 and 4 before the connecting of the retaining wall 46 to the two partitions 30, 32, so that this process can be implemented without being disturbed by the second exhaust-gas routing pipes 52, 54 also provided on the muffler insert 26.

In the course of insertion of the first exhaust-gas routing pipe 44 into the retaining-wall opening 58, the first exhaust-gas routing pipe 44 can be moved with its first end region 62 in an insertion direction in which the fastening-edge region 60 extends from the retaining wall 46. Consequently, the arcuate transition, formed in the course of production of the fastening-edge region 60, between the substantially planar region of the retaining wall 46 and the fastening-edge region 60 can be utilized as an insertion slope.

The inner dimension of the retaining-wall opening 58, or of the fastening-edge region 60, and the outer dimension of the, for instance, substantially cylindrically formed first exhaust-gas routing pipe 44 have been matched to one another in such a manner that the first exhaust-gas routing pipe 44 is retained by press fit in the retaining-wall opening 58, or by the fastening-edge region 60. In the course of insertion of the first exhaust-gas routing pipe 44 into the retaining-wall opening 58, the fastening-edge region 60 is slightly spread apart radially within the range of the elastic deformability thereof, so that it presses against the outer peripheral surface of the first exhaust-gas routing pipe 44 under initial stress. A force closure—that is, a retentive effect generated by frictional interaction—has consequently been engendered between the first exhaust-gas routing pipe 44 and the retaining wall 46, which prevents an unwanted displacement of the first exhaust-gas routing pipe 44 with respect to the retaining wall 46 but, in principle, permits a mobility of the first exhaust-gas routing pipe 44 with respect to the retaining wall 46 in the direction of a longitudinal axis R of the first exhaust-gas routing pipe and in the peripheral direction around the longitudinal axis R—that is, a rotary motion.

The muffler insert 26, supplemented in this manner with the first exhaust-gas routing pipe 44, is subsequently surrounded by the peripheral wall 16. For this purpose, it is possible, for instance, to proceed in such a manner that a plate-like sheet-metal blank of the peripheral wall 16 is firstly provided with a peripheral-wall opening 66 assigned to the retaining-wall opening 58. This peripheral-wall opening 66 can also be provided by a pull-through, so that an outwardly directed fastening-edge region 68 is generated in the region of the peripheral-wall opening 66. The plate-like sheet-metal blank provided with the peripheral-wall opening 66 can then be bent into a pipe-like closed structure and connected—for instance, by welding or/and flanging or such like—in its two edge regions which are then positioned adjacent to one another.

The muffler insert 26 is then inserted in the direction of the longitudinal housing axis L into the peripheral wall 16 provided in this manner with a structure that is closed in the peripheral direction until the installation position of the insert has been attained and the retaining-wall opening 58 is positioned in the direction of the longitudinal housing axis L in the region of the peripheral-wall opening 66. In this state, the first exhaust-gas routing pipe 44 is situated opposite the peripheral-wall opening 66 with its first end region 62 on the inside of the peripheral wall 16.

In a subsequent operation, an intervention into the first exhaust-gas routing pipe 44 is carried out via a tool, and the pipe is moved or pulled in a direction of motion B, with the first end region 62 leading, toward the peripheral-wall opening 66 or the fastening-edge region 68 surrounding it. In the process, the first exhaust-gas routing pipe 44 moves with its second end region 64 in the retaining-wall opening 58 until the state represented in FIG. 6 has been attained, in which the first end region 62 has been positioned so as to engage in the peripheral-wall opening 66 and has consequently been surrounded by the fastening-edge region 68, and the second end region 64 has been positioned so as to engage in the retaining-wall opening 58 and has been surrounded by the fastening-edge region 60 and, as already stated, has been retained in the retaining-wall opening 58 by force closure.

The process of moving the first exhaust-gas routing pipe 44 in the direction of motion B for the purpose of inserting the first end region 62 of the pipe into the peripheral-wall opening 66 can therefore be implemented comparatively easily, since the peripheral wall 16 with its curve-like transition region to the fastening-edge region 68 also provides an insertion slope by which the first end region 62 of the pipe is guided into the peripheral-wall opening 66, and since the fastening-edge region 60 on the retaining wall 46 has also been bent in the direction toward the peripheral-wall opening 66 or the first end region 62 of the pipe—that is, in the direction in which the first exhaust-gas routing pipe 44 is moved in order to insert the first end region 62 of the pipe into the peripheral-wall opening 66. Neither in the region of the retaining-wall opening 58 nor in the region of the peripheral-wall opening 66 is there consequently a risk that a sharp-edged region of the retaining wall 46 or of the peripheral wall 16 will become jammed on the outer surface of the first exhaust-gas routing pipe 44.

The peripheral-wall opening 66 may be dimensioned in such a manner that a force closure with the first end region 62 of the first exhaust-gas routing pipe 44 is also generated there when the region is inserted into the peripheral-wall opening 66. Alternatively or additionally, the peripheral-wall opening 66 may have been configured with a slight allowance with respect to the outer dimension of the first exhaust-gas routing pipe 44 in its first end region 62, so that the first exhaust-gas routing pipe 44 with its first end region 62 is received in the peripheral-wall opening 66 or in the fastening-edge region 68 with slight clearance.

After the first exhaust-gas routing pipe 44 has been inserted into the peripheral-wall opening 66 in such a manner that the first exhaust-gas routing pipe 44 with its first end region 62 terminates substantially flush with the fastening-edge region 68, for instance in the direction of the longitudinal pipe axis R, or protrudes slightly outward beyond the fastening-edge region, the first exhaust-gas routing pipe 44 can be connected to the peripheral wall 16 in the region of the fastening-edge region 68 by a preferentially completely circumferential weld seam in the peripheral direction, in order to guarantee a gas-tight seal. In the course of this process, a further exhaust-gas routing pipe may, for instance, have already been inserted into the first exhaust-gas routing pipe 44 and may consequently be linked to the first exhaust-gas routing pipe 44 or to the peripheral wall 16 by the same weld seam.

In a subsequent operation, the two end walls 22, 24 can then be arranged on the axial end regions 18, 20 of the peripheral wall 16 and connected to the latter in firm and gas-tight manner by welding or/and by positive closure, for instance by flanging. In the process, the second exhaust-gas routing pipes 52, 54 penetrating or engaging in the respective end-wall openings can also be connected to the end walls 22, 24 in firm and gas-tight manner by respectively circumferential weld seams.

In the case of the muffler 12 made in the manner described in the foregoing, the first exhaust-gas routing pipe 44 has been retained stably in its two end regions 62, 64 on the peripheral wall 16 and on the retaining wall 46, respectively, and consequently on the muffler insert 26, in particular so as to oppose evasive movements at right angles to the longitudinal pipe axis R. Since, by virtue of the welding of the first exhaust-gas routing pipe 44 to the peripheral wall 16 in the first end region 62, the pipe is reliably held opposing relocation in the direction of the longitudinal pipe axis R, it is possible to dispense with reshaping the first exhaust-gas routing pipe 44, after it has been arranged in the installation position represented in FIG. 6, in its second end region 64, interacting with the retaining wall 46, in such a manner that also in this region a positive closure, prohibiting a movement in the direction of the longitudinal pipe axis R, between the retaining wall 46 and the first exhaust-gas routing pipe 44 is generated. Nevertheless, it should be pointed out that the force closure generated between the retaining wall 46 and the first exhaust-gas routing pipe 44 also assists a defined axial retention of the first exhaust-gas routing pipe 44 in the direction of the longitudinal pipe axis R in the muffler 12.

Figure 7:
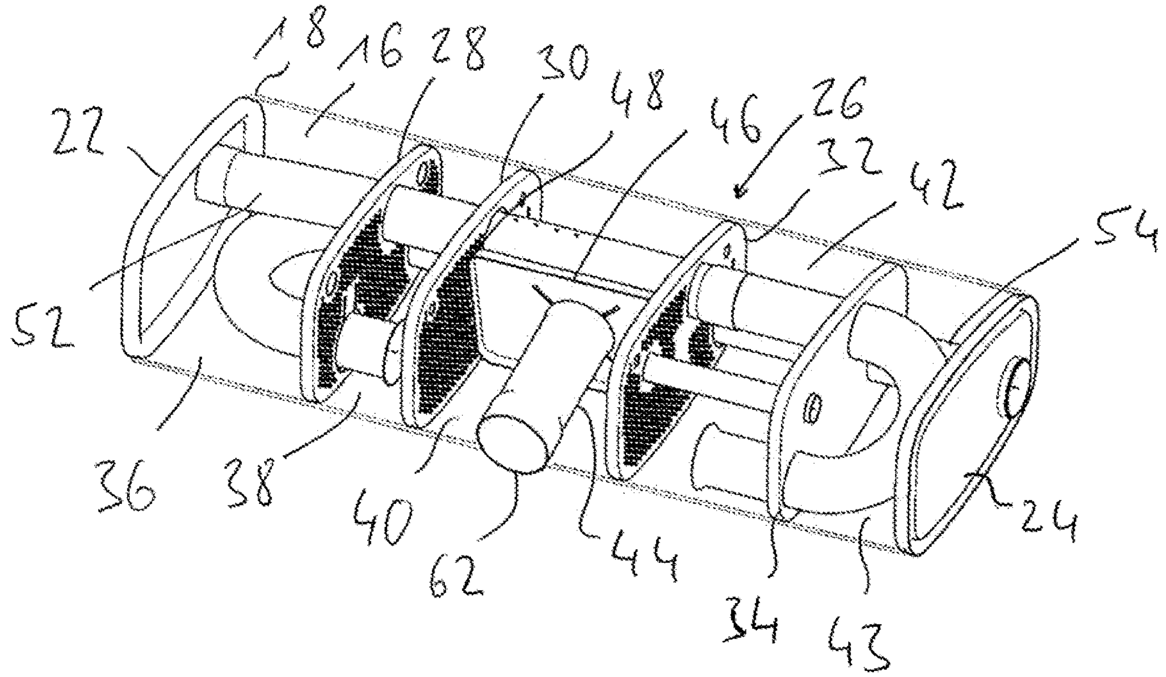
FIG. 7 is a representation corresponding to FIG. 2 in the case of an alternative type of configuration of a muffler.
Figure 8:
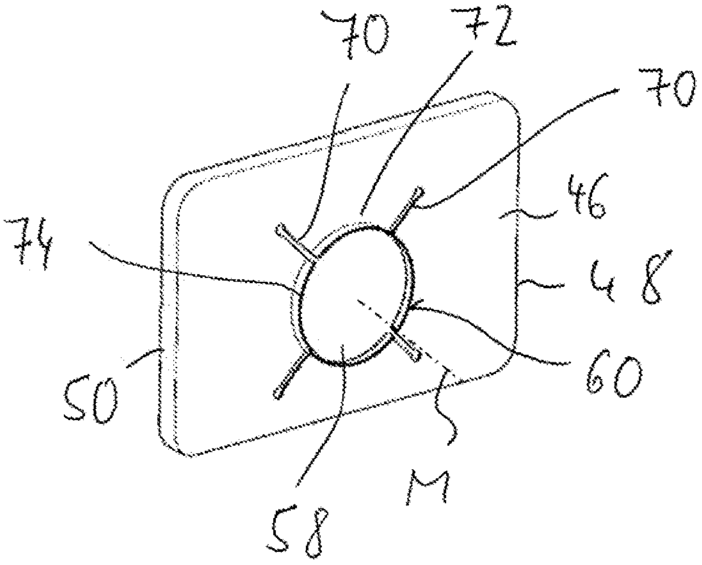
FIG. 8 is a retaining wall of the muffler shown in FIG. 7.

FIGS. 7 and 8 show a modification of the type of configuration of the muffler 12 described in the foregoing. FIGS. 7 and 8 show that a plurality of slot-like wall-interruption regions 70 extending substantially radially with respect to the retaining-wall opening 58 or with respect to a central opening axis M have been provided in the retaining wall 46. In the peripheral direction around the central opening axis M, a retaining-wall tongue 72 has been formed in each instance between each two such wall-interruption regions 70. Since a total of four slot-like wall-interruption regions 70 have been provided in the embodiment represented and are open radially on the inside toward the retaining-wall opening 58, four such retaining-wall tongues 72 surrounding the retaining-wall opening 58 have been provided.

The wall-interruption regions 70 extend into the region of the fastening-edge region 60 and consequently also interrupt the latter in the peripheral direction, so that the fastening-edge region 60 provides a retaining-wall-tongue edge region 74, assigned to each retaining-wall tongue 72.

Figure 5:
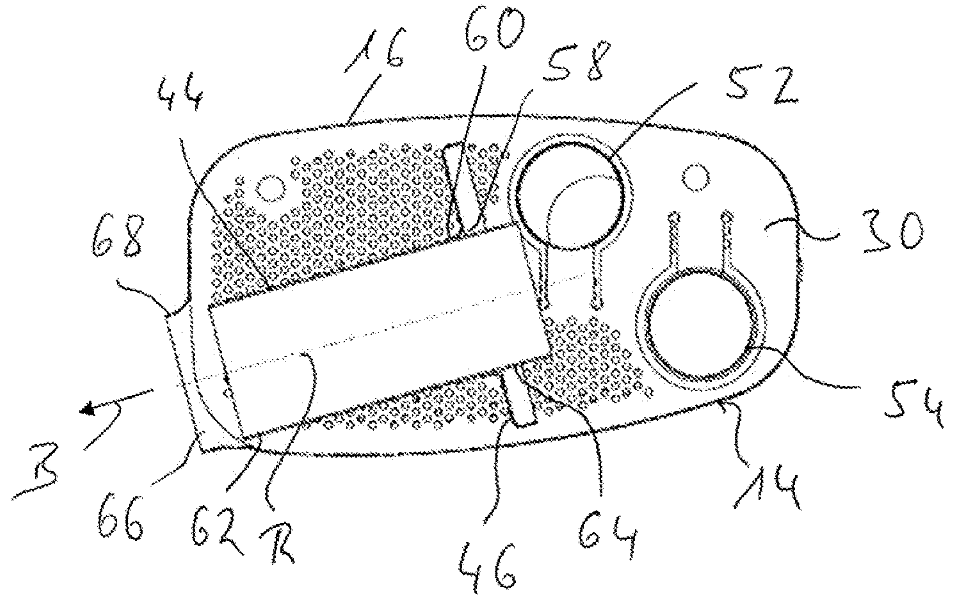
FIG. 5 is a phase of production of the muffler shown in FIG. 2, with exhaust-gas routing pipe not yet positioned so as to engage in a peripheral-wall opening.
Figure 6:
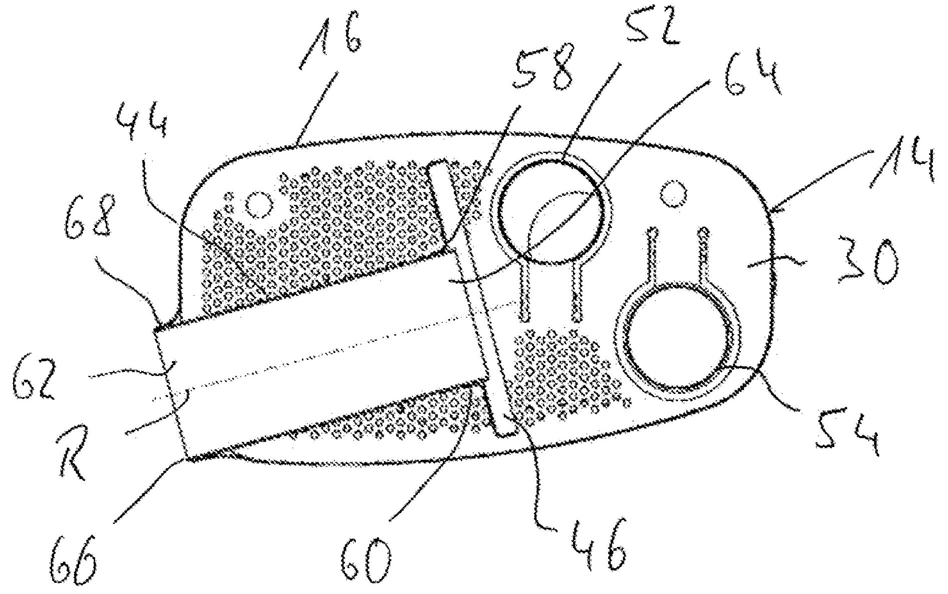
FIG. 6 is a representation corresponding to FIG. 5, with exhaust-gas routing pipe positioned so as to engage in the peripheral-wall opening.

In the case of the configuration of the retaining wall 46 represented in FIGS. 7 and 8, the fastening-edge region 60 has been provided on the retaining wall 46 in such a manner that, with the muffler insert 26 surrounded by the peripheral wall 16, the region extends in the direction away from the peripheral-wall opening 66 provided in the peripheral wall 16, as represented in FIGS. 5 and 6. In the course of assembly of the muffler 12, after the muffler insert 26 has been surrounded by the peripheral wall 16 the first exhaust-gas routing pipe 44 can be moved, with its second end region 64 leading, from outside through the peripheral-wall opening 66 in the direction toward the retaining wall 46 until the second end region 64 of the pipe enters the retaining-wall opening 58 or is inserted into it, subject to press fit. In the process, the retaining-wall tongues 72 can yield within the range of their elastic deformability, or be displaced in the direction of motion of the first exhaust-gas routing pipe 44, as a result of which the fastening-edge region 60 with its retaining-wall-tongue edge regions 74 is slightly spread apart radially and, by reason of the elasticity of the retaining wall 46, presses from radially outside against the outer peripheral surface of the first exhaust-gas routing pipe 44 in the second end region 64. Also by this means, a retentive effect is generated by force closure—that is, by frictional interaction between the first exhaust-gas routing pipe 44 and the retaining wall 46 and consequently the muffler insert 26.

Subsequently, the first exhaust-gas routing pipe 44 can be secured in the region of its first end region 62 to the peripheral wall 16 in the region of the peripheral-wall opening 66 or in the region of the fastening-edge region 68 in the manner described in the foregoing.

It should be pointed out that, also in the embodiment represented in FIGS. 7 and 8, the fastening-edge region 60 might have been provided on the retaining wall 46 in such a manner that, with the muffler insert 26 surrounded by the peripheral wall 16, it extends in the direction toward the assigned peripheral-wall opening 66. In such a configuration, the first exhaust-gas routing pipe 44 can then be provided on the retaining wall 46 in a manner corresponding to FIG. 5 before the muffler insert 26 with the first exhaust-gas routing pipe 44 already provided thereon is surrounded by the peripheral wall 16. The first exhaust-gas routing pipe 44 can then be moved again in the direction of motion B represented in FIG. 5 from inside, with its first end region 62 leading, through or into the peripheral-wall opening 66, and can subsequently be firmly connected to the peripheral wall 16 by welding. Likewise, in the embodiment represented with reference to FIGS. 3 to 6 the fastening-edge region 60 on the retaining wall 46 might have been bent in such a manner that it extends in the direction away from the assigned peripheral-wall opening 66. In this configuration, the first exhaust-gas routing pipe 44 can, after the muffler insert 26 has been surrounded by the peripheral wall 16, then be inserted from outside, with its second end region 64 leading, firstly through the peripheral-wall opening 66 and then into the retaining-wall opening 58. Consequently it can be seen that, advantageously, the fastening-edge region 60, contributing significantly to generating the force closure between the retaining wall 46 and the first exhaust-gas routing pipe 44, on the retaining wall 46 is provided bent in the direction in which the first exhaust-gas routing pipe 44 is moved in order to position the first end region 62 thereof in the peripheral-wall opening 66.

It is further pointed out that the process of surrounding the muffler insert 26 with the peripheral wall 16 might also be implemented in some other manner. This peripheral-wall blank, provided as a plate-like blank and provided with the peripheral-wall opening 66 or with the fastening-edge region 68, might—for instance, after it has already been pre-bent into a curved or pipe-like structure—be positioned or wound around the muffler insert 26, whereupon the peripheral-wall blank is then connected in the mutually adjacent edge regions by welding or/and by positive closure for the purpose of providing the structure that is closed in the peripheral direction. The two end walls 22, 24 might also already be provided on the muffler insert before the surrounding of the muffler insert 26 with the peripheral wall 16 and then, when the muffler insert 26 has been positioned in the interior of the peripheral wall 16 or of the muffler housing 14, either by insertion into the structure, closed in the peripheral direction, of the peripheral wall 16 or by surrounding with a peripheral wall 16 initially still open in the peripheral direction, might be connected to the peripheral wall 16 in the two axial end regions 18, 20 thereof.

Figures 9A, 9B, 9C:
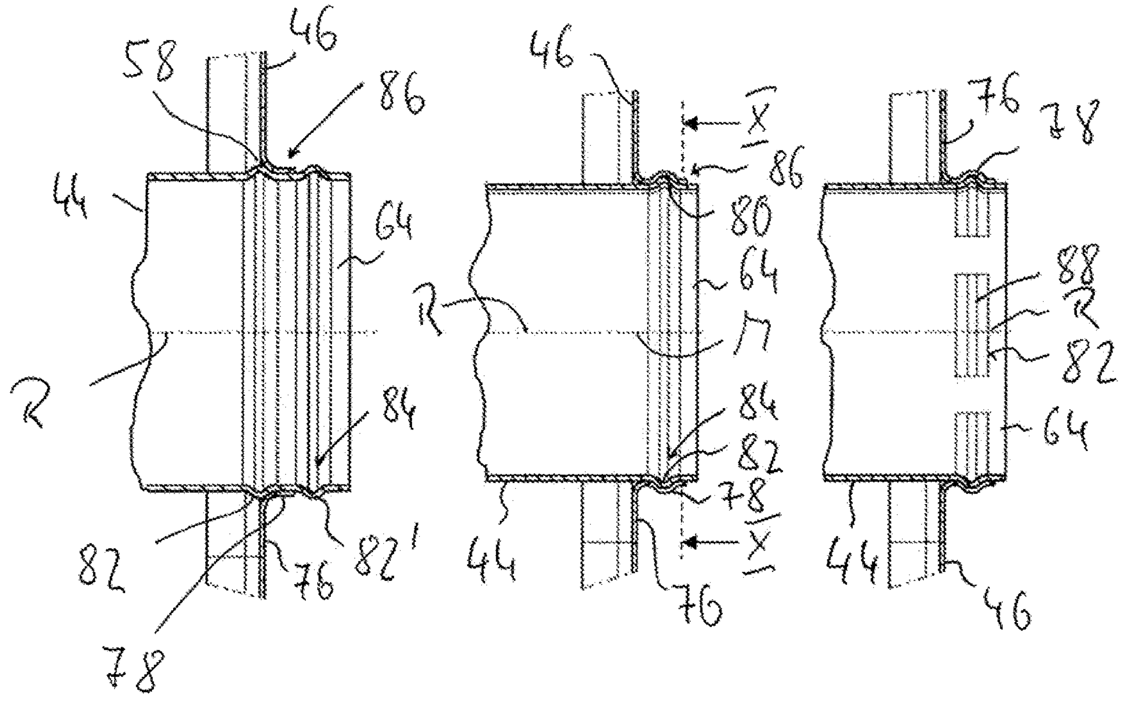
FIGS. 9A, 9B and 9C show various types of configurations of exhaust-gas routing pipes retained on a retaining wall by interlocking; and, FIG. 10 is a cross-sectional view of the type of configuration represented in FIG. 9A.
Figure 10:
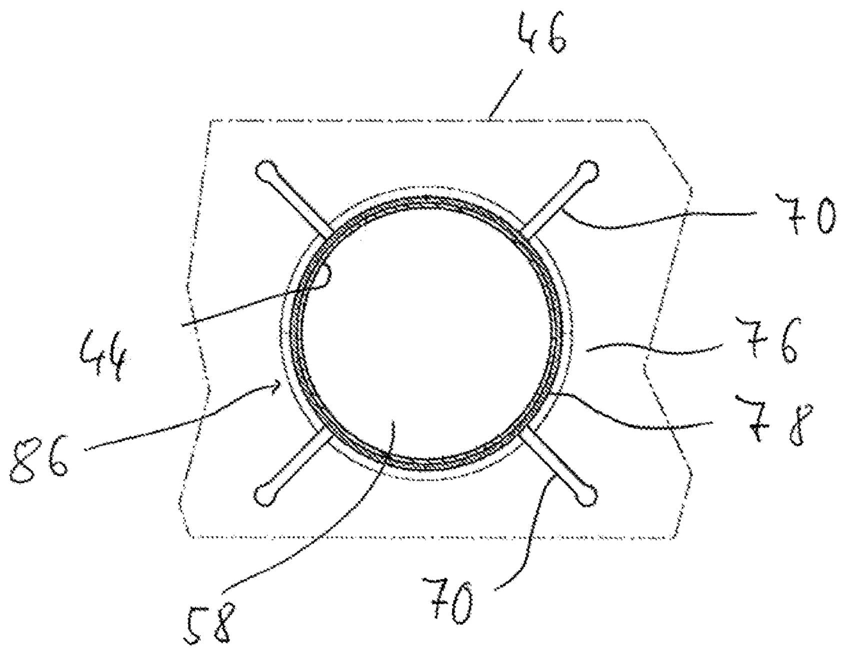

With reference to FIGS. 9 and 10, in the following an alternative configuration will be described which enables a connection of the first exhaust-gas routing pipe 44 in its second end region 64 to the retaining wall 46 without a reshaping of the first exhaust-gas routing pipe 44 or of the retaining wall 46 being necessary after the positioning of the first exhaust-gas routing pipe 44 in the retaining-wall opening 58. In this regard, FIGS. 9A, 9B and 9C show different variants of this configuration, each governed by the same functional principle, in which a retentive interaction between the retaining wall 46 and the first exhaust-gas routing pipe 44 is generated by interlocking.

FIG. 9A shows, in conjunction with FIG. 10, that four slot-like wall-interruption regions 70, open radially inward toward the retaining-wall opening 58, have once again been provided on the retaining wall 46, assigned to the retaining-wall opening 58. These regions also extend into the fastening-edge region 60, so that detent-tongue edge regions 78 of the fastening-edge region 60 have been formed, assigned to the detent tongues 76 formed between, in each instance, two wall-interruption regions 70 adjacent in the peripheral direction. In each of these detent-tongue edge regions 78, a bulge, directed radially outward with respect to the central opening axis M of the retaining-wall opening 58, has been formed which provides a detent recess 80 that is open radially inward.

On the second end region 64 of the first exhaust-gas routing pipe 44 a bead-like shaping, completely encircling the longitudinal pipe axis R in the peripheral direction, has been formed which constitutes a detent projection 82 protruding radially outward with respect to the longitudinal pipe axis R.

The first exhaust-gas routing pipe 44 provides with the detent projection 82 a detent formation 84, whereas a mating detent formation, designated generally by 86, has been provided on the retaining wall 46 with the segments of the detent recess 80 formed in the detent-tongue edge regions 78.

In the course of construction of the muffler 12, the muffler insert 26 can be surrounded by the peripheral wall 16 in the manner described in the foregoing. The fastening-edge region 60 has been provided with its detent-tongue edge regions 78 in such a manner that the detent-tongue edge regions 78 extend in the direction away from the assigned peripheral-wall opening 66.

Subsequently the first exhaust-gas routing pipe 44 can be moved through the peripheral-wall opening 66, with its second end region 64 leading, in the direction toward the retaining wall 46 until the detent projection 82 comes into abutment on the radially inner end regions of the detent tongues 76. Upon further movement of the first exhaust-gas routing pipe 44 into the muffler housing 14, the detent projection 82 entrains the detent tongues 76 in the direction of motion—that is, in the direction away from the peripheral-wall opening 66—until a positioning has been attained in which the initially elastically deformed detent tongues 76 spring back and lock in place on the detent projection 82 with their segments of the detent recess 80.

A state has then been attained in which, even with the first exhaust-gas routing pipe 44 not yet secured to the peripheral wall 16 by welding, the first exhaust-gas routing pipe 44 has been retained by interlocking in a defined positioning in the direction of the longitudinal pipe axis R on the retaining wall 46 and consequently on the muffler 12. Also for this purpose, no deformations of the first exhaust-gas routing pipe 44 or of the retaining wall 46, serving to fasten the first exhaust-gas routing pipe 44 to the retaining wall 46, are required.

Subsequently, the first exhaust-gas routing pipe 44 can be secured to the peripheral wall 16 in the region of its first end region 62 in the manner described in the foregoing.

It should be pointed out that, also in this type of configuration, the fastening-edge region 60 might have been provided on the retaining wall 46 in such a manner that, with the muffler insert 26 surrounded by the peripheral wall 16, the fastening-edge region 60 extends in the direction toward the peripheral-wall opening 66. In this regard, the first exhaust-gas routing pipe 44 can again be positioned in the retaining-wall opening 58 in the region of its second end region 64 in a manner corresponding to the embodiment shown in FIGS. 3 and 4, but in such a manner that the detent projection 82 has not yet been positioned so as to engage in the detent recess 80. After the surrounding of the muffler insert 26, already provided with the first exhaust-gas routing pipe 44, with the peripheral wall 16, the first exhaust-gas routing pipe 44 can then be moved again from inside, with its first end region 62 leading, in the direction toward the peripheral-wall opening 66, and positioned so as to engage therein. In the course of this process, the detent projection 82 likewise moves in the direction toward the peripheral-wall opening 66 and in the process entrains the detent tongues 76 until they interlock on the detent projection 82 with the segments of the detent recess 80 provided on them. Consequently, also in this configuration the detent-tongue edge regions 78 or the fastening edge region 60 on the retaining wall 46 have/has preferentially been bent in the direction in which the first exhaust-gas routing pipe 44 is moved when the first end region 62 is moved into the peripheral-wall opening 66.

FIG. 9B shows a modification in which the detent projection 82 has not been formed encircling the longitudinal pipe axis R in the peripheral direction but comprises a plurality of detent-projection segments 88 succeeding one another in the peripheral direction. Correspondingly, segments of the detent recess 80 subdivided in the detent-tongue edge regions might also be formed, so that an interlocking, effective in the peripheral direction, of the first exhaust-gas routing pipe 44 on the retaining wall 46 is also obtained. This may be advantageous when the first exhaust-gas routing pipe 44 does not have a rotationally symmetrical configuration but is to be positioned in a certain rotary positioning around the longitudinal pipe axis R with respect to the retaining wall 46.

A further modification is shown in FIG. 9C. In this modification, the detent formation 84 on the first exhaust-gas routing pipe 44 includes two bead-like moldings, or detent projections 82, 82' provided thereby, spaced from one another in the direction of the longitudinal pipe axis R. A depression has been formed between the two detent projections 82, 82', into which the retaining-wall tongues 76 provided on the retaining wall 46 can be positioned in engaging manner. Although this is not absolutely essential, a fastening-edge region 60 surrounding the retaining-wall opening 58, with retaining-tongue edge regions 78 provided on the retaining tongues 76 in each instance, may have been provided on the retaining wall 46 also in this embodiment, so that a planar abutting interaction between the first exhaust-gas routing pipe 44 and the retaining wall 46 is obtained also in this embodiment.

Also in the embodiment represented in FIG. 9C, at least one of the detent projections 82 may not be provided by a circumferential bead-like shaping in the peripheral direction on the first exhaust-gas routing pipe 44, but may be interrupted in the peripheral direction and provided, for instance, in the form of several segments.

It is further pointed out that the detent formation 84 may also be provided by a bead-like molding directed radially inward, where appropriate in the form of several segments succeeding one another in the peripheral direction, which provides a detent recess, open radially outward, or several segments thereof. On the retaining wall a shaping, directed radially inward, of the mating detent formation 86, providing a detent projection in each instance, may be provided in the region of the retaining-wall tongues, where appropriate in the region of the respective retaining-wall-tongue edge regions 78, which can be positioned so as to engage in the detent recess provided on the second end region 64 of the first exhaust-gas routing pipe 44 upon movement of the first exhaust-gas routing pipe 44 with respect to the retaining wall 46. This configuration may be advantageous, above all, when the first exhaust-gas routing pipe 44 is moved, with its second end region 64 leading, firstly through the peripheral-wall opening 66 and then so as to engage in the retaining-wall opening 58, since such an allowance of the peripheral-wall opening 66 that a detent projection protruding radially outward on the first exhaust-gas routing pipe 44 can also be passed through the opening is not then required. However, the provision of such a detent recess on the first exhaust-gas routing pipe 44 may result in a diminution of the flow cross-section of the first exhaust-gas routing pipe 44 by virtue of the bead-like moldings, directed radially inward, for providing the recess. The provision of the detent formation 84 by shaping of the first exhaust-gas routing pipe 44 radially outward can therefore be considered as advantageous in principle.

Finally, it is pointed out that the configuration variants described in the foregoing may be varied in various aspects. For instance, more than or less than the four wall-interruption regions represented may have been provided for the purpose of forming respective retaining-wall tongues or detent tongues, and the wall-interruption regions may, for instance, have a greater extent in the peripheral direction, so that, for instance, the peripheral extent of respective wall-interruption regions may be greater than the peripheral extent of retaining-wall tongues or detent tongues formed in each instance between two wall-interruption regions.

It is understood that the foregoing description is that of the preferred embodiments of the invention and that various changes and modifications may be made thereto without departing from the spirit and scope of the invention as defined in the appended claims.

What is claimed is:

1. A method for making an exhaust muffler including a muffler housing defining a longitudinal axis (L) and having a peripheral wall elongated along said longitudinal axis (L); said peripheral wall having first and second end regions and first and second end walls at said first and second end regions, respectively; a muffler insert surrounded by said peripheral wall and supported thereon; said muffler insert having at least one retaining wall extending substantially in a direction of said longitudinal axis (L); said peripheral wall having a peripheral wall opening; at least one first exhaust-gas routing pipe having a first end region and being positioned with said first end region thereof engaging in said peripheral wall opening and being secured to said peripheral wall; said at least one first exhaust-gas routing pipe having a second end region and being secured by said second end region thereof to said at least one retaining wall; and, said at least one first exhaust-gas routing pipe being retained at said second end region on said at least one retaining wall by force closure or interlock, the method comprising the steps of:

a) providing at least one muffler insert with at least one retaining wall and with at least one retaining-wall opening in the at least one retaining wall;
b) providing at least one first exhaust-gas routing pipe;
c) surrounding the at least one muffler insert with a peripheral wall of a muffler housing, a peripheral-wall opening being provided in the peripheral wall and assigned to the at least one retaining-wall opening;
d) arranging the at least one first exhaust-gas routing pipe in such a manner that a first end region of the at least one first exhaust-gas routing pipe is positioned so as to engage in the peripheral-wall opening provided therefor, assigned to the at least one retaining-wall opening, and a second end region of the at least one first exhaust-gas routing pipe is retained in the at least one retaining-wall opening by force closure or interlocking; and, e) connecting the at least one first exhaust-gas routing pipe to the peripheral wall by material closure in the region of the peripheral-wall opening;

wherein, in the course of step a), the at least one first exhaust-gas routing pipe is positioned so as to engage in the at least one retaining-wall opening; and, in the course of step d), is moved, with its first end region leading, from inside in the direction toward the peripheral-wall opening until the first end region is positioned so as to engage in the peripheral-wall opening and the second end region is retained on the at least one retaining wall by force closure or interlocking so as to engage in the at least one retaining-wall opening.

2. The method of claim 1, wherein said at least one first exhaust-gas routing pipe is an inlet pipe.

3. The method of claim 1, wherein said retaining-wall opening is surrounded in some regions thereof by a bent fastening-edge region of said at least one retaining wall and is assigned to said at least one first exhaust-gas routing pipe; and, said at least one first exhaust-gas routing pipe is positioned with said second end region thereof engaging in said retaining-wall opening and is held by press fit in said retaining-wall opening in said region of said fastening-edge region.

4. The method of claim 3, wherein one of the following applies:

a) said fastening-edge region is bent in a direction toward the first end region of said at least one first exhaust-gas routing pipe; or, b) said fastening-edge region is bent away from said first end region of said at least one first exhaust-gas routing pipe.

5. The method of claim 1, wherein said at least one first exhaust-gas routing pipe and said at least one retaining wall conjointly define a complete circumferential abutting contact interface in peripheral direction to provide said force closure therebetween in the region of said retaining-wall opening.

6. The method of claim 1, wherein for providing said force closure between said at least one first exhaust-gas routing pipe and said at least one retaining wall, an abutting contact, interrupted in at least one peripheral region, is provided between said at least one first exhaust-gas routing pipe and said at least one retaining wall in the region of said retaining-wall opening.

7. The method of claim 6, comprising a plurality of wall-interruption regions arranged at a distance from one another around said retaining-wall opening in peripheral direction and open toward said retaining-wall opening.

8. The method of claim 7, wherein each of said wall-interruption regions has a slot-like configuration.

9. The method of claim 1, wherein a first detent formation is provided on said second end region of said at least one first exhaust-gas routing pipe; and, a second detent formation in mating detent engagement with said first detent formation is provided on said at least one retaining wall.

10. The method of claim 9, wherein said at least one first exhaust-gas routing pipe defines a longitudinal pipe axis (R); and, said first detent formation includes at least one detent projection protruding radially outward with respect to said longitudinal pipe axis (R) of said at least one first exhaust-gas routing pipe.

11. The method of claim 10, wherein at least one of the following applies:

a) said first detent formation includes at least two detent projections succeeding one another in a direction of said longitudinal pipe axis (R); and, b) said first detent formation includes at least two detent-projection segments succeeding one another around said longitudinal pipe axis (R) in peripheral direction.

12. The method of claim 11, wherein each detent tongue of said second detent formation engages between two detent projections of said first detent formation succeeding one another in the direction of said longitudinal pipe axis (R).

13. The method of claim 12, wherein a detent recess for receiving at least one detent projection of said first detent formation is provided on each detent tongue.

14. The method of claim 13, wherein a bent detent-tongue edge region is provided on said at least one retaining wall near each detent tongue.

15. The method of claim 13, wherein at least one detent recess is provided on each detent-tongue edge region.

16. The method of claim 12, wherein each detent-tongue edge region engages between two detent projections of said first detent formation succeeding one another in the direction of said longitudinal pipe axis (R).

17. The method of claim 9, wherein said at least one retaining wall further has a plurality of wall-interruption regions arranged at a peripheral distance from one another around said retaining-wall opening and open toward the retaining-wall opening; and, said second detent formation defines a detent tongue between at least two wall-interruption regions immediately succeeding one another in the peripheral direction.

18. The method of claim 17, wherein each of said wall-interruption regions has a slot-like configuration.

19. The method of claim 10, wherein each of said detent projections is provided by a bead-like shaping of said at least one first exhaust-gas routing pipe.

20. The method of claim 1, wherein said muffler insert includes at least two partitions arranged so as to be substantially orthogonal to said longitudinal axis (L) and supported on said peripheral wall; and, said at least one retaining wall is secured to one of said partitions in each of two opposite end regions of said at least one retaining wall.

21. The method of claim 20, wherein said muffler insert includes at least one second exhaust-gas routing pipe, a partition opening provided in at least one of said partitions connected to said at least one retaining wall and assigned to said at least one second exhaust-gas routing pipe, and an end-wall opening provided in one of said end walls; and, said at least one second exhaust-gas routing pipe is positioned so as to engage in said partition opening and in said end-wall opening and is secured by material closure in at least one of the following:

a) in the region of the end-wall opening to the end wall defining said opening; and, b) in the region of at least one partition opening to the partition defining said opening.

22. The method of claim 1, wherein, in the course of step a), the at least one muffler insert is provided in such a manner that the at least one retaining wall is connected to a partition in each of two opposite end regions of said wall.

23. The method of claim 1, wherein, in the course of step c), the at least one muffler insert is surrounded with the peripheral wall by winding of a plate-like peripheral-wall blank around the at least one muffler insert; or, wherein, in the course of step c), the at least one muffler insert is surrounded by providing the peripheral wall with a structure that is closed in the peripheral direction and inserting the at least one muffler insert into the peripheral wall provided with a structure that is closed in the peripheral direction.

24. The method of claim 1, further comprising a step f) for securing an end wall to each of the axial end regions of the peripheral wall by at least one of material closure and positive closure before or after implementation of step c).

* * * * *